Figure 1:
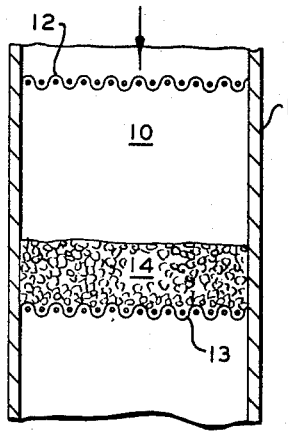

Sept. 22, 1964  P. L. GOMORY  3,150,076
FLUID-SOLID CONTACTING APPARATUS AND PROCESSES
Filed Dec. 28, 1959

INVENTOR.
P. L. GOMORY
BY
Hudson & Young
ATTORNEYS

United States Patent Office 3,150,076
Patented Sept. 22, 1964

3,150,076
FLUID-SOLID CONTACTING APPARATUS
AND PROCESSES
Paul L. Gomory, Bethesda, Md., assignor to Phillips
Petroleum Company, a corporation of Delaware
Filed Dec. 28, 1959, Ser. No. 862,268
12 Claims. (Cl. 208—120)

This invention relates to contacting a fluid with solid particles. In one aspect, the invention relates to contacting a fluid by passing said fluid through a bed of solid particles and disrupting said bed by varying the conditions within the contact zone. In another aspect, the invention relates to a fluid-solid contacting process in which the solid comprises a bed of particles and conditions are varied within the contact zone to move the particles under the influence of one of gravity and buoyancy. In another aspect, the invention relates to contacting a fluid with solid particles by passing the fluid upwardly through said particles at a velocity sufficient to maintain the particles in a bed against an overhead barrier and reducing the rate of flow of fluid sufficient to disrupt said bed. In another aspect, the invention relates to a process for contacting a fluid with solid particles wherein said particles are lighter than said fluid. In another aspect, this invention relates to processes of the type described above, in which a condition within the contact zone is varied periodically to cause movement of said particles within said zone. In another aspect, this invention relates to processes of the type described above, in which a condition within the contact zone is varied in a pulsating manner thereby providing continuous agitation of said particles within said zone and thus increasing the contacting efficiency between fluid phases. In other aspects, this invention relates to fluid-solid contacting processes of the type described above, applied to fractionation, solid adsorption treatment, catalytic chemical reactions, and filtration. In a still further aspect, the invention relates to a combination of apparatus components, including movable, contained but unattached contacting particles adapted to effect the process or methods described herein. Also, in another aspect, the invention relates to particles as herein described which have an average density relative to a liquid or fluid in the method or process such that alteration of the flow of liquid or fluid can alter the posture of said bed, said particles being such that they are maintained in position by the flow of the fluid or fluids, for example, a particle can be somewhat heavier than the fluid but due to the fluid flow it will be kept in its place in a bed and vice versa.

In another aspect, the invention relates to a solid particle comprising a core lighter than a fluid with which the particle is to be contacted and a coating on said core with material heavier than said fluid, said particle being lighter than said fluid. In another aspect, the invention relates to such a particle having a hollow core. In another aspect, the invention relates to such a particle having a core made of a materal lighter than said fluid.

It is often desirable in various physical and chemical treatments of fluid materials to contact such fluids with solid particles. For example, in solvent extraction, to improve the contact between the solvent and the charged fluid, such contact can be carried out in a contacting zone having solid particles therein which the combined stream contacts. Other processes in which contacting the fluid with the solid is in itself the important function performed, include for example, clay-treating and catalytic chemical reactions. A third reason for contacting fluids with solid particles is to remove filterable materials from the fluids. In all of these processes, one or more of the following difficulties may occur. The solid particles may become coated by contact with the fluid, thus decreasing the effectiveness of the contact with the fluid. The fluid passageways may become clogged with material either filtered from the fluid or formed by the reaction taking place in the fluid and thus reduce the flow through the passageways and contact of the fluid with the solid. Channels may be formed in the bed of solid particles thus permitting the fluid to pass through the bed without sufficient contacting with the solid material. Other difficulties and problems which can be solved by the technique and/or apparatus of the invention will be apparent to one skilled in the art in possession of this disclosure. The invention provides as it were an increased area at an interface between fluids or liquids when more than one fluid is present in the system, as in fractionation, solvent extraction, etc.

It is an object of the present invention to increase the efficiency of contacting between a fluid and solid particles. It is another object of the invention to permit easy cleaning of solid particles being contacted by fluids. Another object of the invention is to provide a method to remove channels formed in a bed of solid particles being contacted by a fluid. Another object of the invention is to provide a method for removing material filtered out on a bed of solid particles being contacted by a fluid. Another object of the invention is to provide solid particles for contacting with a fluid. Another object of the invention is to improve the efficiency of processes involving contacting of fluids with solid particles, for example, solvent extraction, clay-treating, catalytic chemical reactions, and filtration.

Other aspects, objects, and the several advantages of the invention are apparent from a study of the disclosure, the drawings, and the appended claims.

According to this invention, there is provided a process for contacting a fluid with a solid, comprising passing the fluid through a contacting zone having therein a quantity of particles containing said solid, at a velocity sufficient to move said particles in the direction of flow of said fluid, toward the end of said zone forming a bed therein, varying conditions within said zone to produce movement of said particles in said zone. Also according to this invention, there is provided a process of this type in which said particles are moved under the influence of one of gravity and buoyancy. In some of the embodiments of this invention, the condition within said zone which is varied is the rate of flow of said fluid. The invention further provides a process for contacting a fluid with a solid which comprises passing the fluid upwardly through a quantity of particles of the solid at a velocity sufficient to lift the particles, thereby forming a bed of the particles against an overhead barrier, reducing the rate of flow sufficient to disrupt the bed and thereafter increasing the rate of flow to re-establish the bed. The invention further provides processes for contacting a fluid with solid particles, in which said particles are lighter than said fluid. The invention further provides processes for contacting a fluid with a solid in which a condition in the contact zone is varied periodically. The invention further provides processes of this type in which a condition within the contact zone is varied in a pulsating manner. The invention further provides processes of the type described above applied to specific contacting operations, for example, fractionation, adsorption treating, catalytic chemical reactions, and filtration.

Futher, according to the invention, there are provided solid particles which are light enough to float in the fluid being contacted, such particles comprising a core lighter than said fluid and a coating heavier than said fluid, the complete particles being lighter than said fluid. The invention provides further, a process for contacing a fluid with a solid which comprises passing the fluid upwardly through a bed of particles which are lighter than the fluid and reversing the rate of flow of fluid to disrupt the bed of particles.

In processes involving contacting of a fluid with a bed of solid particles, one difficulty which is encountered is in channeling of the fluid through the bed. When this occurs in an ordinary fixed bed type of operation, it is necessary to shut down the unit involved and repack the bed.

In some fluid-solid contacting processes, difficulty is encountered through the formation of a coating on the solid particles or the clogging of flow passages through the bed with material which filters out in the bed. Either of these occurrences may result in reduced efficiency of contact between the fluid and the solid and/or reduced flow through the bed. Channeling may also, in some instances, be due to the presence of such extraneous material in the bed.

All of the above difficulties may be avoided, alleviated, or remedied by the practice of my invention. In the practice of my invention, there is present in a contact zone a quantity of solid particles. During normal operation, the fluid contacts the particles, flows through the contact zone at a rate sufficient to carry the particles to the end of the contact zone, and thereby forms a bed of the particles against a barrier which may, for example, be a screen. To prevent or remedy the difficulties which may be encountered due to channeling, coating, or filtration, a condition within the zone is varied sufficiently to provide movement of the particles through at least a portion of the zone, thereby disrupting the bed. This permits filtered material to be removed by agitating the particles, permits any coating thereon to be likewise agitated, and in many instances, removed, and uncovers new areas of the particles to contact with the fluid. When the original conditions within the zone are again attained, the bed is re-formed in the contact zone but minus the coating and/or filtered material and re-arranged to eliminate any channels which may have formed by the arrangement of the particles in the bed.

The following four types of operation are among those included within the concept of the present invention.

(1) The normal rate of flow through the contact zone may be upward and the particles being contacted heavier than the fluid. In this instance, the particles are carried upward, forming a bed, by flowing the fluid at a rate greater than the rate at which the particles fall through the fluid. The velocity necessary is a function of such quantities as the relative densities of the solid particles and the fluid, the size and shape of the solid particles, the size and shape of the contacting zone, and the viscosity of the fluid. Calculations to determine the velocity with reasonable accuracy are within the skill of the art. In some instances, it may be desirable to make approximate calculations and determine the exact velocity required by experimentation. To disrupt the bed when desired, the upward velocity is reduced sufficiently to permit the particles to move downwardly within the contact zone under the influence of gravity.

(2) When the normal rate of flow is upward through the contact zone and the particles being contacted are lighter than the fluid, the bed will be maintained at all times when the contact zone is filled with the fluid and the flow varies from zero to a positive value in the upward direction. The particles may be moved within the zone by reversing the flow, that is, by providing a downward flow within the zone sufficient to overcome the natural buoyancy of the particles in the fluid.

(3) With the same conditions as under (2), that is, a normal upward flow to the zone and particles lighter than the fluid, the bed may be disrupted by removing the fluid from the contact zone, thereby permitting the particles to fall under the influence of gravity. It is not necessary, of course, to remove all of the fluid from the zone but only to lower the fluid level sufficiently to permit the particles to move a sufficient distance to provide the desired amount of agitation. The latter type of operation may be accomplished by providing an elongated weir over which a liquid spills into a chamber from which the product is withdrawn and varying the rate of withdrawal.

(4) If the normal rate of flow through the zone is in a downward direction and the particles are lighter than the fluid being contacted, the bed will be formed by providing a rate of flow sufficient to overcome the buoyancy of the particles and cause them to move to a lower part of the zone and form a bed therein. The particles may be caused to move by reducing the downward flow sufficiently to permit the particles to rise due to their buoyancy in the fluid.

In the first three of the above embodiments it is noted that, under proper conditions of upward flow velocity, movement of the particles within the zone may be produced by reducing the density and/or viscosity of the fluid flowing through the zone while maintaining the flow constant. Similarly, in embodiment (4), movement of the particles upward within the zone may be produced by increasing the density of the fluid without reducing the downward rate of flow.

Figure 2:
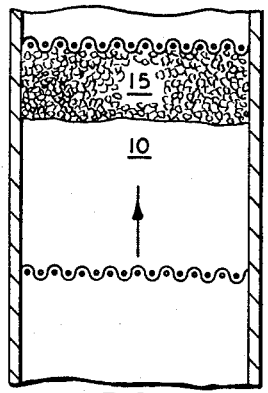
Figure 3:
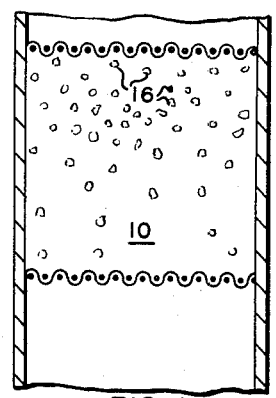
Figure 4:
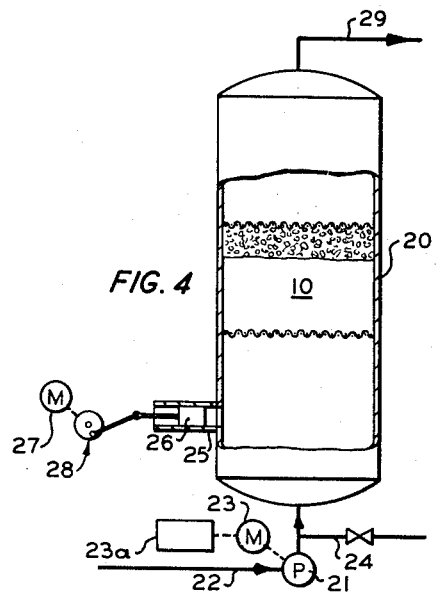
Figure 5:
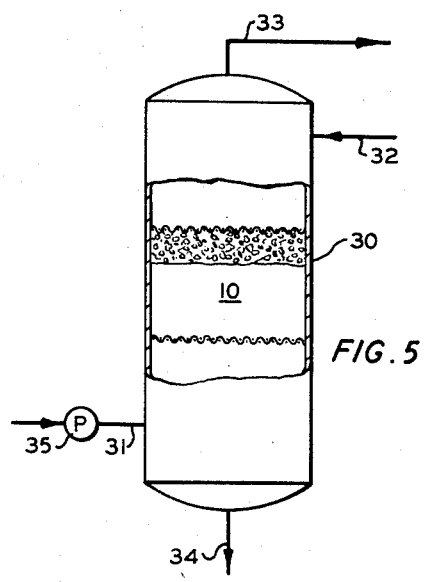
Figure 6:
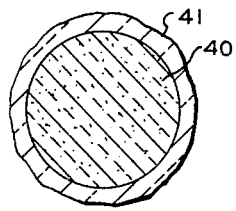
Figure 7:
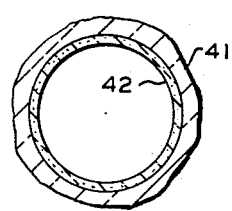

In the drawings, FIGURES 1, 2, and 3 are more or less schematic cross sections of a contact zone illustrating the various stages in the formation and disruption of the bed of solid particles. FIGURE 4 is a schematic drawing, partially in cross section, of a vessel including a contact zone and provided with means to change the rate of flow of the fluid. FIGURE 5 is a partial cross section of a vessel including a contact zone, provided with means to change the rate of flow of the fluid and arranged to permit countercurrent flow of two fluids therethrough. FIGURE 6 is a partial cross section of a lighter than fluid particle having a core made of a material lighter than the fluid. FIGURE 7 is a partial cross section of a lighter than fluid particle having a hollow core.

In FIGURE 1, the contact zone 10 is defined by vessel wall 11, upper screen 12, and lower screen 13. Within zone 10 is layer 14 of solid particles. In FIGURE 2, the particles are shown formed into a bed 15 in the upper part of contact zone 10. In FIGURE 3, bed 15 has been disrupted and the solid particles 16 present are dispersed within contact zone 10.

FIGURE 4 illustrates a vessel 20 which includes contact zone 10 and is provided with sufficient means to demonstrate the variation in the rate of flow useful in the practice of the invention. Pump 21 is provided on inlet line 22 and is driven by variable speed electric motor 23. Motor 23 may be provided with a timer 23a which may be adjusted to periodically reduce, stop, or reverse the speed of motor 23 and thus similarly adjust the speed of pump 21 to regulate the rate of flow, as desired. A branched inlet line 24 is provided and intercepts inlet line 22. A cylinder 25 communicates with vessel 20 and is provided with piston 26 which is driven by electric motor 27 through a suitable crank and rod system shown at 28. Outlet line 29 communicates with the upper part of vessel 20 above contact zone 10.

FIGURE 5 illustrates a vessel 30 which includes contact zone 10 and which is arranged to permit countercurrent contacting of two fluids. One fluid enters through inlet line 31 and the other through inlet line 32. There are provided upper and lower outlets 33 and 34, respectively. Variable velocity pump 35 is provided on inlet line 31 and vessel 30 may also be provided with a piston and cylinder such as piston 26 and cylinder 25 of FIGURE 4, but not shown in FIGURE 5.

The particle illustrated in FIGURE 6 comprises a core 40 of a material lighter than the fluid in which the particle is to be utilized and a coating 41 of material with which it is desired to contact the fluid. The ratio of the amount of the material in core 40 to the material in the coating 41 is such that the average density of the complete particle is less than that of the fluid in which it is to operate. It is not essential that coating 41 be continuous and, in some instances, it may even be desirable to incorporate the material with which the fluid is to be contacted into the core material by a simple mixing process but, in most instances, it is preferred to incorporate the contacting material on the outside of the core, thereby making a greater relative quantity of it available for contacting with the fluid.

FIGURE 7 also illustrates a particle which is lighter than the fluid in which it operates. In this embodiment, however, core 42 is in the form of a hollow shell and thus, the material from which it is made may be heavier or lighter than the fluid in which the particle is to be used and still have a core lighter than the fluid. Here again the contact material 41 may be coated continuously or discontinuously on the surface of the core or may be incorporated in the material from which the core is formed.

Core 40 of the embodiment illustrated in FIGURE 6 may, for example, be made from a synthetic resin and of particular utility are the resins disclosed in U.S. Patent 2,825,721. Other materials, however, having the desired characteristics such as density range, toughness, insolubility, etc., may be used. Similar low density materials may be used to form the hollow core 42 but this core may also be formed of heavier materials such as suitable metals or metallic alloys having desired characteristics and the core obtains the necessary low density from the inclusion within the hollow space of low density materials such as air, helium, etc., or this space may be partially evacuated.

As pointed out elsewhere, it is not necessary in all embodiments of this invention to use particles which are lighter than the fluid being contacted. It is, however, desirable in most instances to utilize particles which are relatively close to the density of the fluid, whether the particles are slightly heavier or slightly lighter than the fluid. This permits the contacting bed to be stirred by movement of the particles forming the bed with a minimum change in the conditions within the contact zone. Of course, the size and shape of the particles must be taken into consideration also in determining the density desired in a particular application.

Throughout the specification where flow in a specific direction is indicated and reduction in or reversal of flow rates are referred to it is intended that this description should be understood to relate to the net rate of flow through the zone where countercurrent flow of fluid is taking place as well as to the flow of a single fluid through a contact zone. For example, in solvent extraction or fractional distillation ordinarily there will be countercurrent flow through the contact zone and the operation of the process according to this invention in these instances depends upon the net flow through the zone.

The invention is not limited to a vessel having a single contacting zone or a single bed of particles. For example, the invention is suited for use in fractional distillation wherein it is desirable to provide a bed of particles to increase the contact between ascending vapors and descending liquids and, in some instances, it is desirable to provide a plurality of beds which may be utilized alone or in conjunction with other types of contacting apparatus, for example, bubble trays.

*Example I*

As an example of the type of operation included in (1) above, cracked gasoline is treated by contact with fuller's earth to remove, by selective polymerization, objectionable, unstable constituents. Fuller's earth of 20 mesh and a specific gravity of 0.78 is charged to contact zone 10 of vessel 20, FIGURE 4. Cracked gasoline having a specific gravity of 0.75 is pumped through inlet line 22 at a rate of 1,000 gallons per minute. The cross sectional area of vessel 20 at zone 10 is 6.7 sq. ft., thus, resulting in an upward superficial velocity of the gasoline through this zone of 20 ft./min., sufficient to maintain the particles of fuller's earth in a bed at the upper portion of zone 10, as shown. At intervals of 60 minutes, the speed of motor 23 is reduced, the interval being set by adjustment of timer 23a, to reduce the speed of pump 21 and thereby reduce the rate of flow of gasoline into vessel 20 to 100 gallons per minute, thus reducing the upward velocity of gasoline through contact zone 10 to 2 ft./min., permitting the particles forming the bed to drop through zone 10 thus agitating the bed and loosening therefrom polymerized material and permitting such material to flow outward from vessel 20 and be separated from the gasoline. At the end of the desired cleaning period, timer 23a again actuates motor 23 to increase its speed and, therefore, the speed of pump 21, thereby re-establishing the normal rate of flow through vessel 20 and re-establishing the bed of particles in the top of zone 10.

As an alternative to varying the speed of pump 21, motor 27 can be started, thus actuating cylinder 25 and piston 26 to create pulses in the flow of gasoline through the treater thus agitating the particles and cleaning said particles.

*Example II*

As an example of the type of operation included in (2) above, a feed material comprising straight run gasoline having a boiling range of 250 to 401° F. is fed to vessel 30 in FIGURE 5 through inlet 31. The feed is countercurrently contacted with a methyl carbitol (diethylene glycol monomethyl ether)-water mixture which is introduced through line 32. Within contact zone 10 is a quantity of hollow glass spheres having a specific gravity of 0.95 thus floating in the liquid contained within zone 10. The raffinate is removed through line 33 and the extract through line 34. The rates of flow through the lines 31, 32, 33 and 34 are, respectively, 100, 1,000, 60 and 1,040 gallons per minute. In this operation, this results in a net rate of flow downward through contact zone 10 of 1,040 gallons per minute (5 ft./min.), zone 10 having a cross sectional area of 28 sq. ft. When it is desired to clean the bed of spheres formed in zone 10, the rate of flow of solvent through line 32 is increased sufficiently to create a net downward rate of flow through zone 10 of 5,000 gallons per minute (24 ft./min.), thus moving the particles downward within the zone 10. The rate of flow of solvent can then again be reduced below the transport velocity of the spheres permitting the spheres to reform in a bed at the top of zone 10 minus any channels in the bed which may have occurred prior to the bed agitation. Alternatively, the spheres may be continuously agitated within vessel 30 by means of a reciprocating pump attached to said vessel 30 as shown in FIGURE 4 and indicated by 25, 26, 27 and 28. Continuous agitation of the spheres with a reciprocating pump frequency of about 60 cycles per minute causes an increase in interfacial area between the two immiscible fluid phases and thus results in increased extraction efficiencies.

*Example III*

As an example of the type of operation included in (3) above, the water used in an oil field water flood system is filtered through a bed of polyethylene pellets. These pellets, being lighter than the water being filtered will float therein, thus forming a bed in the upper portion of the filter zone. This bed is formed in zone 10 of vessel 20 and the water is pumped through vessel 20 by pump 21. The upward flow rate of the water is not critical since any flow at all effectively prevents downward migration of the pellets forming the filter bed since they are lighter than the water.

When the pressure drop through the filter bed reaches an undesirably high value, pump 21 is stopped, thus stopping the flow of water into vessel 20 and the valve in line 24 is opened, thus draining out the water remaining in the vessel. As the water is withdrawn, the polyethylene particles move downwardly through zone 10 under the influence of gravity, which effectively stirs the filter bed to allow the removal therefrom of the material filtered from the water. The valve in line 24 is then closed and pump 21 restarted, which re-establishes the flow of water through zone 10 and again forms a filter bed in the upper portion thereof.

*Example IV*

As an example of the type of operation included in (4) above, gas oil is cracked by contacting the oil at high temperature and high pressure with a silica-alumina catalyst. The catalyst is in the form illustrated in FIGURE 7 and comprises a coating 41 of silica-alumina on a hollow core 42 of popped volcanic ash. The catalyst is formed by mixing the finely ground silica-alumina catalyst with the popped volcanic ash and a binder material and prilling, followed by activating, during which the binder material is decomposed or burned out. Thus, a single catalyst pill may comprise one of a plurality of hollow spheres 42 coated with the catalyst material. The proportion of catalyst to the popped volcanic ash is controlled to give a specific gravity of the final product of 0.45. Thus, this catalyst will float in the oil being treated, which has a specific gravity of 0.50. The oil is passed downwardly through a contact zone 10 at a linear velocity of 20 ft. per min., thus forming a bed in the lower portion of zone 10 as illustrated in FIGURE 1. Periodically the flow rate is reduced sufficiently to permit the catalyst particles to rise in zone 10, thus freeing the bed of material filtered from the feed stock or formed in place.

In all of the embodiments of the invention, it will be understood that the bed cleaning operation may be performed more or less gently or vigorously as needed in the particular operation to provide a quicker and possibly more thorough cleaning on the one hand and to protect the solid particles on the other. For example, the rate at which the speed of pump 21 is varied may be adjusted within a wide range and, when using the embodiment comprising the pulsating piston, the vigorousness of the bed stirring operation may be controlled by varying the speed at which the piston is driven and by changing the bore and stroke of the piston.

Suitable means, not shown, may be provided for withdrawing materials separated from the bed and/or removed from the particles which form the bed from contact zone 10 and suitable inlets and outlets may also be provided for flowing a solvent or a flush liquid through the zone to remove the extraneous material.

Although the drawings have been prepared illustrating the bed of solid particles formed in each instance as being relatively shallow as compared with the entire depth of the contacting zone, it will, of course, be understood that the invention is not so limited but relates to various depths of both the bed and the contacting zone and specifically to an operation in which the contacting zone is substantially filled with solid particles, there being only a relatively minor proportion of the zone available for movement of the particles in the manner described in the various embodiments.

Herein and in the claims, the phrase "particles containing said solid" can be composed entirely of said solid or can be only partly composed of said solid. Also, the "particle" can be hollow, have a core and can have a density relative to the fluid or fluids such that the flow of the fluid when it is desired to maintain the bed, herein discussed, will maintain the bed in the position desired.

Reasonable variation and modification are possible within the scope of the foregoing disclosure, the drawings, and the appended claims to the invention the essence of which is a process for contacting a fluid with a solid by passing the fluid through a bed of particles containing the solid and disrupting the bed by varying the conditions within the contact zone, and wherein in one embodiment, conditions are varied within the contact zone to move the particles under the influence of one of gravity and buoyancy, and wherein in another embodiment, the bed of particles is disrupted by varying the rate of flow between normal rate and a condition of no flow, and wherein in another embodiment, the particles float in the liquid under the conditions of no flow.

I claim:

1. A method for improving the contacting of a fluid with a solid to effect an action between said fluid and said solid whereby a material is deposited on said solid which comprises the steps of passing the fluid through a contacting zone having therein a quantity of particles containing said solid, at a velocity sufficient to move said particles in the direction of flow of said fluid toward the end of said zone to form there and to maintain said particles in a bed against a barrier at the end of said zone, continuing said passing of said fluid through said contacting zone and, therefore, effecting said action between said fluid and said solid for a desired length of time thus depositing said material on said particles while collecting fluid which has passed through said zone, then, reducing flow of fluid through said zone to move said particles under the influence of one of gravity and buoyancy in the opposite direction sufficiently to disrupt said bed and release said material from said particles but continuing the flow of said fluid, nevertheless, through said zone thus regenerating said solid, then again moving said particles to said end by re-establishing said velocity to form again and to maintain said bed of particles against said barrier, and, during the reduced flow of fluid, collecting fluid flowing through said contacting zone separately from fluid passing through said zone during the desired length of time.

2. A method for improving the contacting of a fluid with a solid to effect an action between said fluid and said solid whereby a material is deposited on said solid which comprises the steps of passing the fluid through a contacting zone having therein a quantity of particles containing said solid, at a velocity sufficient to move said particles in the direction of flow of said fluid toward the end of said zone to form there and to maintain said particles in a bed against a barrier at the end of said zone, continuing said passing of said fluid through said contacting zone and, therefore, effecting said action between said fluid and said solid for a desired length of time thus depositing said material on said particles while collecting fluid which has passed through said zone, then, varying the flow of fluid conditions within said zone to move said particles under the influence of one of gravity and buoyancy in the opposite direction sufficient to disrupt said bed and release said material from said particles, then again moving said particles to said end by re-establishing said velocity to form again and to maintain said bed of particles against said barrier, thus regenerating the same, and, during the varying of said flow of fluid conditions, collecting any fluid flowing through said contacting zone separately from fluid flowing through said zone during said desired length of time.

3. A method for improving the contacting of a fluid with a solid to effect an action therebetween whereby a material is deposited on said solid and whereby any channeling which tends to occur can be avoided, which comprises the steps of passing the fluid through a contacting zone, having therein a quantity of particles containing said solid, at a velocity sufficient to move said particles in the direction of flow of said fluid toward the end of said zone to form there and to maintain said particles in a bed against a barrier at the end of said zone, continuing the flow of said fluid and, therefore, effecting said action between said fluid and said solid for a desired length of time thus depositing said material on said particles, then varying the flow of fluid conditions within said zone to move said particles under the influence of one of gravity and buoyancy in the opposite direction sufficiently to disrupt said bed and release said material from said particles, then again moving said particles to said end by re-establishing said velocity to form again and to maintain said bed of particles against said barrier, thus regenerating the same, and, during the varying of said flow of fluid conditions, collecting any fluid flowing through said contacting zone from fluid passing through said zone during said desired length of time.

4. A method for improving the contacting of a fluid with a solid to effect an action therebetween whereby a material is deposited on said solid and whereby any channeling which tends to occur can be avoided, which comprises the steps of passing the fluid through a contacting zone, having therein a quantity of particles containing said solid, at a velocity sufficient to move said particles in the direction of flow of said fluid toward the end of said zone to form there and to maintain said particles in a bed against a barrier at the end of said zone, continuing the flow of said fluid and, therefore, effecting said action between said fluid and said solid for a desired length of time thus depositing said material on said particles, then, varying the flow of fluid conditions within said zone to move said particles under the influence of buoyancy in the opposite direction sufficiently to disrupt said bed and release said material from said particles, then again moving said particles to said end by re-establishing said velocity to form again and to maintain said bed of particles against said barrier, thus regenerating the same, and, during the varying of said flow of fluid conditions, collecting fluid flowing through said contacting zone from fluid passing through said zone during said desired length of time.

5. A method for removing material filtered out on a bed of solid particles contacted with a fluid which comprises passing the fluid through a contacting zone, having therein a quantity of particles containing said solid, at a velocity sufficient to move said particles in the direction of flow of said fluid toward the end of said zone to there form and to maintain said particles in a bed against a barrier at the end of said zone, continuing the flow of said fluid, and, therefore, effecting action between said fluid and said solid for a desired length of time thus depositing said material on said particles, then, varying flow of fluid conditions within said zone to move said particles under the influence of one of gravity and buoyancy in the opposite direction sufficiently to disrupt said bed and to release said material from within the particles of said bed, removing said material from said zone while retaining said particles in said zone, then again moving said particles to said end by re-establishing said velocity to again form and to maintain said bed of particles against said barrier, thus regenerating the same, and, during the varying of said flow of fluid conditions, collecting any fluid flowing through said contacting zone separately from fluid passing through said zone during said desired length of time.

6. A method for treating cracked gasoline with fuller's earth and for removing therefrom unstable constituents onto a bed of solid particles of fuller's earth, which comprises the steps of passing the gasoline through a contacting zone, having therein a quantity of particles containing said fuller's earth at a velocity sufficient to move said particles in the direction of flow of said gasoline toward the end of said zone to there form and to maintain said particles of fuller's earth in a bed against a barrier at the end of said zone, continuing the flow of said gasoline, and, therefore, effecting action of said fuller's earth on said gasoline for a desired length of time, then, varying flow of fluid conditions within said zone to move said fuller's earth's particles under the influence of one of gravity and buoyancy in the opposite direction sufficiently to disrupt said bed and to release material which has been deposited onto said bed from said gasoline from the particles of said bed, removing said material from said zone while retaining said fuller's earth in said zone, then again moving said fuller's earth's particles to said end by re-establishing said velocity to form again and to maintain said bed of fuller's earth's particles against said barrier, thus regenerating the same, and, during the varying of said flow of fluid conditions, collecting any gasoline flowing through said contacting zone separately from gasoline passing through said contacting zone during said desired length of time.

7. In a method for improving the contacting of a solvent and a liquid being solvent extracted therewith by reducing the tendency of raffinate and extract phases to channel one through the other and to otherwise lack intimate contact which comprises providing within the solvent extraction zone in a section thereof at which an improved contacting is desired a mass of contact particles which, responsive to a net flow of fluid in the zone, will be maintained in a bed of particles against a barrier at one end of said section, flowing solvent and liquid to be extracted through said zone at a net flow rate sufficient to cause the formation of said bed, and, during the flow of solvent and liquid, removing from said zone a raffinate phase and an extract phase, then when, as by formation channeling in the bed, it is desired to regenerate the bed, altering the net flow of fluid in the zone to permit said bed to become disrupted under the influence of one of gravity and buoyancy, then again immediately moving said particles to reform said bed by re-establishing said a net flow of fluid in said zone.

8. In a method for improving the contacting of a solvent and a liquid being solvent extracted therewith by reducing the tendency of raffinate and extract phases to channel one through the other and to otherwise lack intimate contact which comprises providing within the solvent extraction zone in a section thereof at which an improved contacting is desired a mass of contact particles which responsive to a net flow of fluid in the zone will be maintained in a bed of particles against a barrier at one end of said section, flowing solvent and liquid to be extracted through said zone at a net flow rate sufficient to cause the formation of said bed and during the flow of solvent and liquid removing from said zone a raffinate phase and an extract phase, then when, as by formation channeling in the bed, it is desired to regenerate the bed, cyclically altering the net flow of fluid in the zone to permit said bed to become momentarily disrupted under the influence of one of gravity and buoyancy, then, again immediately moving said particles to reform said bed by re-establishing said a net flow of fluid in said zone.

9. A method for removing material filtered out from an impure water containing the same onto a bed of solid polyethylene particles contacted therewith which comprises passing the water upwardly through a contacting zone, having therein a quantity of polyethylene particles at a velocity sufficient to move said polyethylene particles upwardly toward the end of said zone to there form and to there to maintain said polyethylene particles in a bed against a barrier at the end of said zone, continuing the flow of said water, and, therefore, effecting action between said water and said polyethylene particles for a desired length of time until the pressure drop through said particles reaches an undesirably high value due to the disposition of material on said particles, then, stopping the flow of water within said zone to move said polyethylene particles downwardly under the influence of gravity to disrupt said bed and to release said material from within the particles of said bed, removing said material from said zone while retaining said polyethylene particles in said zone, then again moving said polyethylene particles upwardly to said end of said zone by re-establishing said velocity to form again and to maintain said bed of particles, thus regenerating the same.

10. A process for cracking a gas oil and liquid phase with a silica alumina catalyst and for removing material deposited out on a bed of solid particles containing said catalyst which comprises passing the oil under conversion conditions through a cracking zone, having therein a quantity of particles containing said catalyst, at a velocity sufficient to move said particles in the direction of flow of said oil toward the end of said zone to form there and to maintain said particles in a bed against a barrier at the end of said zone, continuing the flow of said oil for a desired length of time and, therefore, subjecting the same to cracking, then, varying flow of fluid conditions within said cracking zone to move said particles under the influence of one of gravity and buoyancy in the opposite direction sufficiently to disrupt said bed and to release said material filtered from the gas oil and material formed in said zone from within the particles of said bed of catalyst, removing said materials from said zone while retaining said catalyst particles in said zone, then again moving said catalyst particles to said end of said cracking zone by re-establishing said velocity to form again and to maintain said bed of catalyst particles, thus regenerating the same, and, during the varying of said flow of fluid conditions, collecting fluid, flowing through and from said contacting zone and containing said materials, separately from oil passing through said zone during said desired length of time.

11. Apparatus for contacting a fluid and a subdivided solid comprising in combination, a vessel, controlled powered means for moving a fluid into and from said vessel at variable rates of flow to a first point therein, said controlled powered means including means for reducing, stopping and reversing said powered means, means at a second point substantially removed from said first point for removing said fluid from said vessel, a mass of solid subdivided particles, forming a part of said apparatus in said vessel between said points, means located between one of said points and said mass of solid subdivided particles to prevent egress from said vessel of said particles, means for causing flow of fluid through said vessel, and powered means including a cylinder in open communication with said vessel, said cylinder having mounted therein for reciprocating action therein a piston and means attached to said piston for causing alteration of the rate of flow within said vessel in rapid pulsations.

12. Apparatus for contacting a fluid and a subdivided solid comprising in combination, a vessel, controlled powered means for moving a fluid into and from said vessel at variable rates of flow to a first point therein, said controlled powered means including means for reducing, stopping and reversing said powered means, means at a second point substantially removed from said first point for removing said fluid from said vessel, a mass of solid subdivided particles, forming a part of said apparatus in said vessel between said points, means located between said first point and said mass of solid subdivided particles and means located between said second point and said mass of solid subdivided particles to prevent egress from said vessel of said particles, and powered means including a cylinder in open communication with said vessel, said cylinder having mounted therein for reciprocating action therein a piston and means attached to said piston for causing alteration of the rate of flow within said vessel in rapid pulsations.

References Cited in the file of this patent

UNITED STATES PATENTS

| | | |
|---|---|---|
| 674,763 | Harris | May 21, 1901 |
| 1,117,601 | Porter | Nov. 17, 1914 |
| 1,118,441 | Porter | Nov. 24, 1914 |
| 1,794,765 | Green | Mar. 3, 1931 |
| 2,101,961 | Slidell | Dec. 14, 1937 |
| 2,233,980 | Jewell | Mar. 4, 1941 |
| 2,937,752 | Deschere | May 24, 1960 |
| 2,987,465 | Johanson | June 6, 1961 |